May 11, 1943.  G. M. MAST  2,318,874
PICTURE FILM DISPLAY MACHINE
Filed Nov. 2, 1940  3 Sheets-Sheet 1

Inventor
Gifford M. Mast.
Walter N. Haskell.
By his Attorney

May 11, 1943.　　　　G. M. MAST　　　　2,318,874
PICTURE FILM DISPLAY MACHINE
Filed Nov. 2, 1940　　　　3 Sheets-Sheet 2

Inventor
Gifford M. Mast,
Walter N. Haskell,
By
his Attorney

May 11, 1943.    G. M. MAST    2,318,874
PICTURE FILM DISPLAY MACHINE
Filed Nov. 2, 1940    3 Sheets-Sheet 3

Inventor
Gifford M. Mast.
Walter N. Haskell,
his Attorney

Patented May 11, 1943

2,318,874

UNITED STATES PATENT OFFICE 2,318,874

PICTURE FILM DISPLAY MACHINE

Gifford M. Mast, Davenport, Iowa

Application November 2, 1940, Serial No. 364,091

7 Claims. (Cl. 88—31)

My invention has reference to a picture film display machine, designed for use on a case or counter in a sales room for stereoscopic instruments and strips of picture films to be used therewith. One of such instruments is incorporated in the machine, with a portion of film with a series of pictures thereon supported so as to be passed through the same for being viewed, the film being in the form of a loop, or band, permitting the pictures, and titles and advertising matter interspersed therewith, to be run through the machine continuously.

In instruments of the type referred to which have been in common use for some time, and which include means for viewing the pictures on a strip of film, means is provided for advancing the strip of film by hand, and in the present invention a mechanical means is provided, by which the strip of film is propelled by an intermittent or step-by-step movement. This is carried on automatically, and in such a manner that there will be an interruption of the movement of the film at the end of each feed movement, of sufficient length to permit a brief period of time in which to view the pictures.

While the invention is specially adapted for use in the display of pictures of a scenic type, devoted to some locality or event, it has a wider scope in connection with some business operations, with pictures bearing upon the operation of the business, to be shown for advertising purposes. Still another use is in the educational field, for the purpose of showing pictures in connection with certain studies, to facilitate the giving of instruction along various lines. Still other uses will suggest themselves to those interested in advertising and other programs.

Another feature of the invention consists of the arrangement of the viewing apparatus with a light in rear of it, within a casing or cabinet within which the mechanism is contained, rendering the pictures plainly visible to the one using the machine. In this connection means is provided for interrupting the light while the film is being advanced to a new position, so that there may be no confusion with other pictures or material on the moving film. The movement of the film can also be interrupted for any desired time, with the light in full force, if it is desired to study any particular picture for a greater length of time than the operation allows.

Another purpose of the invention consists of the provision of a mirror in one face of the casing, having half-silver surfaces, upon which advertising matter can be provided, which will be visible and readable at such times as the cabinet is illuminated, and will not show at other times. The advertising matter has to do with the sales campaign being carried on by the machine.

The above named, and other features and advantages of the invention will more fully appear from the following specification, reference being had to the drawings accompanying the same, in which.

Figure 1:
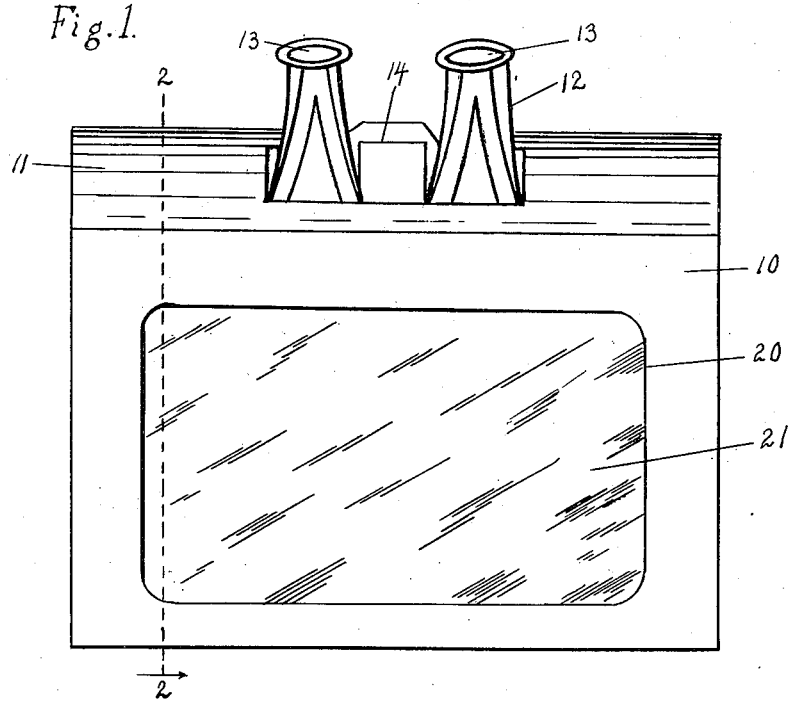
Fig. 1 shows the invention in front elevation.
Figure 2:
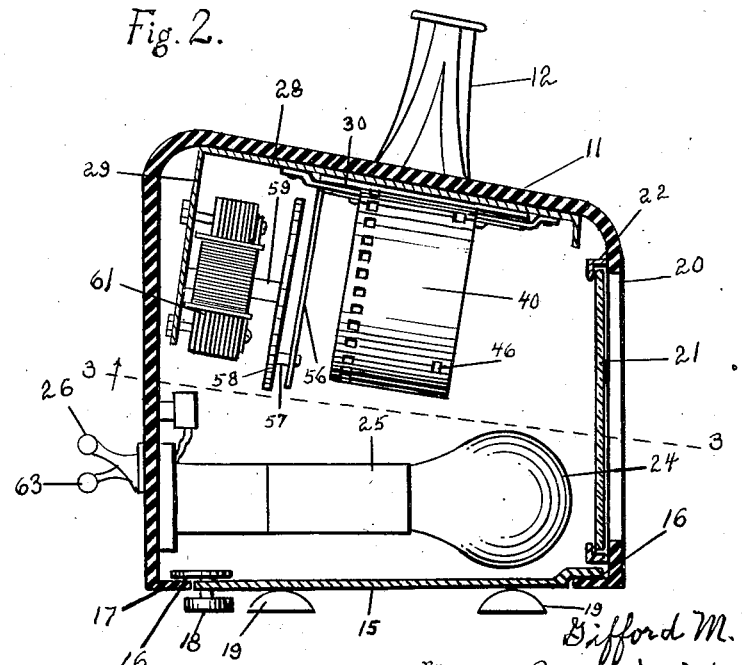
Fig. 2 is a transverse section on the line 2—2 of Fig. 1.

As set forth and described herein the invention embraces a box or casing 10, having a sloping top 11, in an opening in which is held a pair of eye-pieces 12, fitted in their outer ends with lenses 13, and united by a bridge portion 14. The bottom of the casing has an opening, closed by a removable plate 15, engageable at one side with a ledge 16 of the casing, and provided at the other side with a catch 17 engageable with a similar ledge 16, and adapted to be turned by a turn-button 18. The outer face of the plate 15 is also provided with rubber feet 19, of non-marring effect.

By reason of the sloping character of the top 11 it is more convenient to use the eye-pieces by sitting or standing at one side of a counter or table, and in the lower front wall of the casing is an opening 20, closed by a mirror 21, supported by a frame 22. The surfaces of the mirror plate are half-silvered, and the same can be provided with advertising matter of any desired character. In rear of the mirror is an electric bulb 24, supported in a socket 25, and connected with a source of electrical power, under the control of a switch at 26, by means of which the light can be turned on or off.

Figure 3:
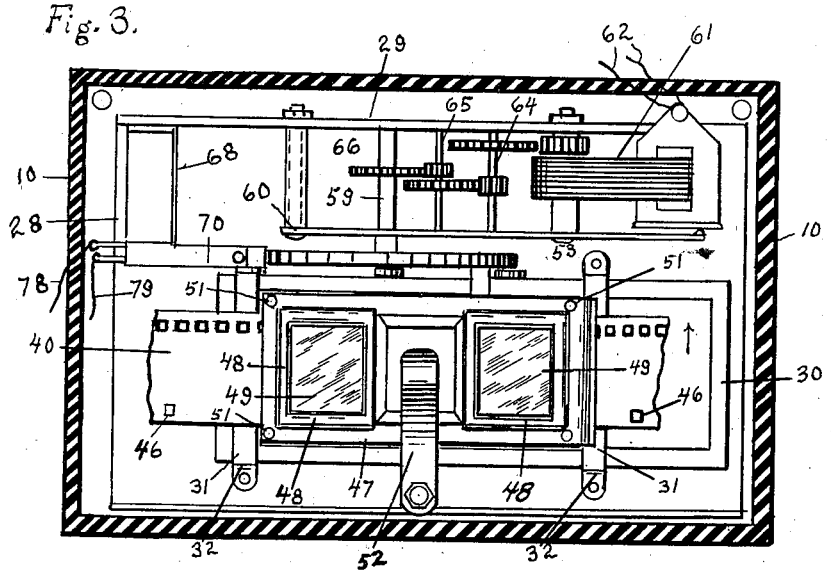
Fig. 3 is an internal view on the line 3—3 of Fig. 2.
Figure 4:
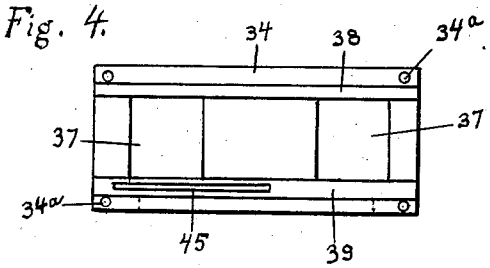
Fig. 4 is a view of the plate 34, detached.
Figure 5:
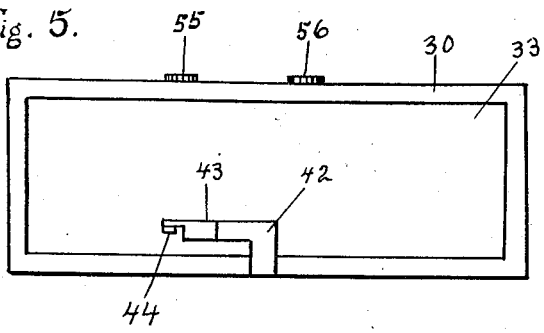
Fig. 5 is a view of the frame 30, detached.

Secured in the upper part of the casing 10 is a plate 28, provided with an angle-plate 29, which plates provide the principal frame or mounting for the chief part of the operating mechanism. As shown in Fig. 3 of the drawings a frame 30 is supported against the plate 28 for a slidable movement by means of a pair of metal straps 31, secured to the plate 28 at their ends, and provided with shoulders 32 against which the edges of the slide-frame ride. The frame 30 has a large opening 33, to accommodate a guide-plate 34 forming part of the stereoscopic unit, and secured to a frame 35 at the inner ends of the eye-pieces by means of screws 36, in openings 34a in the corners of said plate. The plate 34 has a pair of sight openings 37 in line with the lenses 13, and on the inner face of said plate are tracks 38 and 39, to receive and guide a strip of film 40, which strip, however, is in the form of a loop or band, as before mentioned, so that the movement thereof within the sight range will be continuous, with the pictures and other subjects thereon following each other in succession, until they have all been displayed. In practice the cabinet and operative parts of the invention are of proportions suited to use with a standard 35 movie picture film.

In the lower part of the plate 34 is a recess 41, permitting a reciprocating movement of an angle-plate 42 fixed to the lower side of the frame 30, to which angle-plate is secured a spring-arm 43, at the end of which is a ratchet-tooth 44, projecting through a slot 45 in the plate 34, for engagement with one of a set of perforations 46 arranged at intervals near one edge of the film 40, a series of similar perforations being provided near the other edge of the film, for use when the same is printed, or in propelling the same through a stereoscope.

The viewing instrument hereinbefore referred to includes another plate 47, provided with inwardly projected portions or bosses 48, containing openings in line with the lenses 13 and the openings 37 in the plate 34. The openings in the plate 47 are fitted with closures 49 of translucent material, such as ground Celluloid, through which light from the bulb 24 is directed outwardly through the pictures on the film, rendering the same readily discernible to any one looking into the eye pieces. In the corners of the plate 47 are small openings 51, which are entered by the heads of the screws 36, which project slightly beyond the face of the plate 34, when fully seated. The plate 47 is thus held from a shifting movement in any direction, and by means of a spring arm 52 fixed at one end to the plate 28 said plate is held removably in place. When in position the plate 47 contacts the inner face of the film sufficiently to compel it to travel along the tracks in the plate 34; and at one end the plate is formed into a curved guide 53, assisting in the entry of the film between the plates 34 and 47.

If it is desired to remove the loop of film for any purpose as for substituting another loop of film therefor, this can be done by turning the arm 52 downwardly and removing the plate 47, permitting the release of the film. By a reversal of the operation the film can be returned to place.

It will be obvious that by a reciprocating movement of the slide-frame 30 the spring tooth 44 can be made to alternately engage one of the perforations 46 and advance the film 40 for a predetermined distance, and execute a return movement, with the tooth merely sliding over the surface of the film, until another opening 46 is encountered. This reciprocating movement is accomplished by the following means: Projected from one edge of the frame 30 are relatively long arms 56 and 55, engageable by a pin 57 on one face of a disk 58, fixed on a shaft 59, supported rotatably in the plate 28 and a plate 60 held in parallel relation therewith. At one end of said plates is supported a motor 61, connected by wires 62 with a source of electrical supply, under the control of a switch at 63, by means of which the current to the motor can be turned on or off, to start the motor or stop it again, as desired. The rotary movement of the shaft of the motor is imparted to the shaft 59, to give rotation thereto, by means of shafts 64 and 65, and gearing connecting the same, as indicated at 66, which may be in the form of clockwork wheels and pinions.

Figure 6:
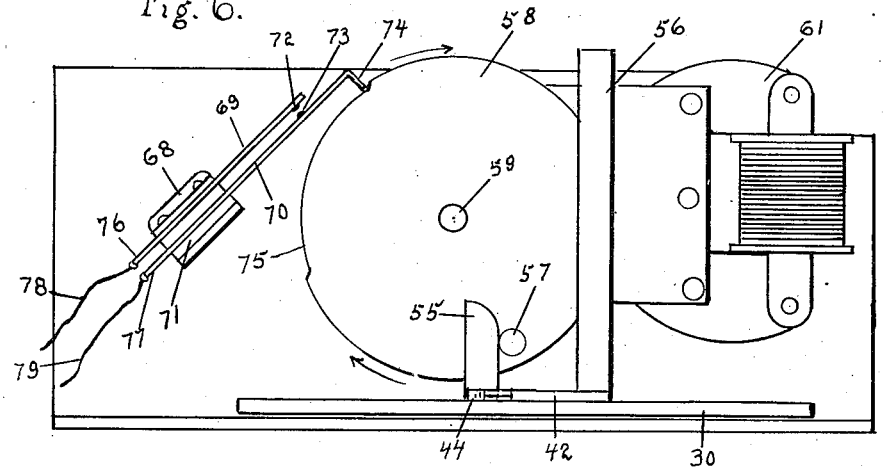
Fig. 6 is a view looking in the direction of the small arrow in Fig. 3, with the film and holding plate omitted.
Figure 7:
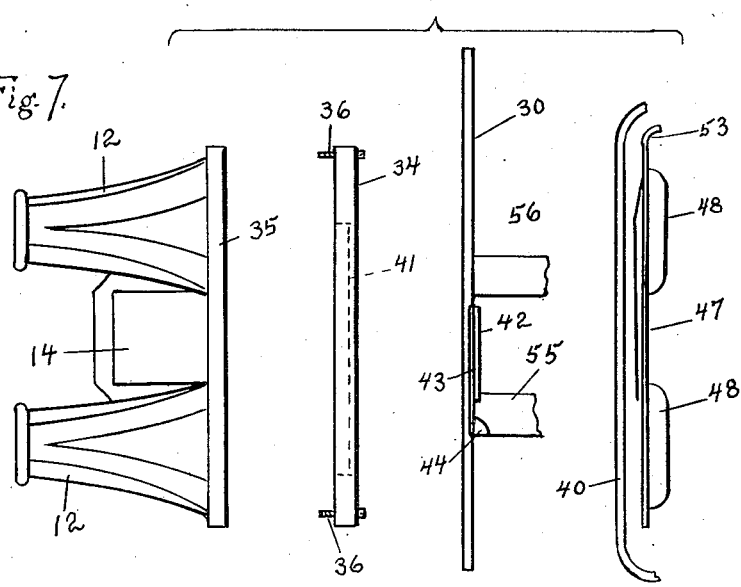
Fig. 7 is an exploded view of the viewing instrument and related parts.
Figure 8:
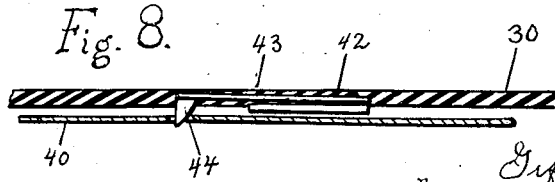
Fig. 8 is a detail of the spring tooth 44 for feeding the film.

Upon the shaft 59 and disk 58 being given a rotary movement, in a direction indicated by the arrows in Fig. 6, the pin 57 engages the arm 55, causing a movement of the frame 30, in a direction to cause the film 40 to be advanced to a new position. This movement continues for approximately a fifth revolution of the disk, following which the pin passes the end of the arm 55, and the frame 30 and film come to a rest. The disk then idles for a portion of its movement, until the pin 57 comes in contact with the arm 56, causing a reverse movement of the frame 30, and carrying such frame to a point for engagement of the ratchet tooth 44 with another of the perforations 46, the spacing of which coincides with the length of feed movement of the disk. This return movement of the disk and pin embraces about four-fifths of the revolution of the disk, during which period of time the film remains at rest, with ample time in which to view the pair of pictures that is exposed for display in the machine. So long as the operation of the machine continues, this display will also be in effect, with new pictures, title frames and advertising cards being brought into focus, until the entire series has been viewed. If it is desired to study any particular picture for a greater length of time than that allowed, the operation of the motor can be interrupted by throwing the switch 63, and the picture retained in view until the switch is thrown again.

The arrangement of the pictures on the film is in pairs, alternating with other pictures, title frames, etc. in the spaces between, and in the movement of the film these other subjects are shown, mixed in with the pairs that are being displayed. To avoid confusion and misunderstanding, means are provided for darkening the cabinet during each film movement, with the light turned on as soon as the feed movement ceases. This is effected by the following means: Secured to the inner face of the plate 29 is a bracket 68, the end of which supports a pair of terminals 69 and 70, spaced from each other and provided with insulating material at 71. The terminal 70 possesses a resilience tending to hold it away from the terminal 69, and on the inner faces of said terminals are points 72 and 73, which are held normally in contact by means of a finger 74 at the end of the terminal 70, bearing against the edge of the disk 58. At their other ends the terminals are projected into connectors 76 and 77, to which are attached wires 78 and 79, connected with the electric circuit leading to the light 24. At such times as the electric switch 26 is thrown on, and the points 72 and 73 in contact, a circuit is closed through said light circuit, with the light at 24 turned on, and the interior of the casing illuminated. At one point in its periphery the disk 58 is of reduced size, so as to produce an arc 75 of shorter radius than that of the rest of the disk, and upon this part being encountered by the finger 74, the terminal 70 springs away from the terminal 69 sufficiently to cause a separation of the points 72 and 73, breaking the circuit, and extinguishing the light in the bulb 24. The casing is thereby darkened, this effect being produced coincidently with the advance movement of the film. At the end of such movement the terminal 70 is again moved outwardly through contact with the larger part of the disk, and the light is again turned on. By this means the viewing of the pictures will only take place while the film is in a stationary position, and will be continuous during such time. The extinguishing of the light will also interrupt the showing of any advertising matter in rear of the mirror 21, and only the face of the mirror, with its reflecting power, will be in evidence.

When in use, it is designed to have the cabinet set on a counter, or table, where stereoscopes and pictures are on sale, or where other advertising or educational material is being displayed. Upon the motor being started, the machine requires no further attention, and the movement of the film and series of pictures thereon will be continuous, until the motor is again turned off. The pictures can be viewed without the help of an assistant, although that can be added if desired. By the use of the switch 26 the light is turned on, and the illumination will be continuous during the operation of the film devices, except at such times as the light is interrupted, in the manner above described. The constant turning of the light on and off, particularly in connection with the mirror transparency in the front of the cabinet, which also goes off and on with each action of the light, provides an eye catcher, which attracts prospective customers to the sales machine.

The invention is set forth herein in its preferred showing, with the evident possibility of changes in the construction and manner of operation of the machine, without departing from the spirit and scope of the invention, as set forth and claimed herein.

What I claim, and desire to secure, is:

1. A display machine for picture films containing series of pictures arranged to be displayed in pairs, comprising a cabinet, a stereoscopic apparatus mounted in said cabinet, provided with picture viewing tunnels, and having a cross-channel for the passage of a piece of film in loop formation, a slide-frame movable in said channel, provided with a pair of operating arms, and engageable with said film to cause a feed movement thereof in a given direction, a disk rotatably mounted in proximity to said slide-frame, provided with a pin engageable with said arms, means for the continuous operation of said disk, and means for illuminating the inner ends of said tunnels.

2. A machine of the class described, comprising a cabinet, a stereoscopic apparatus mounted in said cabinet, provided with picture viewing tunnels, equipped with suitable lenses, and having a cross-channel for the passage of a piece of picture film, an endless loop of film containing series of pictures arranged to be displayed in pairs, slidable in said passage, and provided with perforations at intervals near one of its edges, a slide frame adjacent to said channel, provided with a spring tooth engageable with said perforations, to give a feed movement to said film in a given direction, means for giving a reciprocating movement to said slide-frame, and means for illuminating the inner ends of said tunnels.

3. In a display machine for picture films containing series of pictures arranged to be displayed in pairs, a cabinet, a stereoscopic apparatus mounted in said cabinet, provided with picture viewing tunnels, equipped with suitable openings and closures therefor, and having a cross-channel for the passage of a piece of picture film in the form of a continuous loop, a slide frame in said channel engageable with said film to give an intermittent feed movement thereto, means for reciprocating said slide-frame, means for lighting said cabinet, and means for interrupting the lighting means during the feed movement of the film.

4. In a display machine for picture film containing series of pictures arranged to be displayed in pairs, a cabinet, a stereoscopic apparatus mounted in the cabinet, provided with picture viewing tunnels, and a cross-channel for the passage of a strip of picture film for viewing in said tunnels, a slide-frame adjacent to said channel, provided with a pair of operating arms, and engageable with a strip of film to impart a feed movement thereto in a given direction, a disk rotatably mounted, provided with a pin engageable with said arms, and provided with a reduced portion in its periphery, means for continuously operating said disk, a lighting means in said cabinet, connected with an electrical source, and a switch in circuit with said light, having a part riding on said disk to hold the circuit normally closed, and engageable with said reduced portion to break the circuit and extinguish the light, coincidently with the feed movement of the film.

5. A machine of the class described, comprising a cabinet, a stereoscopic apparatus mounted in said cabinet, provided with a pair of picture viewing tunnels, equipped with suitable lenses, and having a cross-channel for the passage of a piece of picture film, a slide-frame in said channel, provided with a spring tooth for engagement with such film, to give a feed movement thereto, means for giving a reciprocating movement to said slide-frame, and an endless loop of film slidable in said channel containing series of pictures arranged to be displayed in pairs, and provided at intervals with means for engagement of said tooth, for a predetermined amount of feed movement of said film, the spaces between said engaging means corresponding with the amount of said feed movement.

6. In a display machine for picture films, a stereoscopic apparatus adapted for use with a motion picture type of film, provided with a series of pictures for showing successive pairs thereof, and having engaging means at spaced intervals along one of its edges, comprising a hollow body member through which pictures can be viewed, provided with a cross-channel for the passage of a strip of film, a slide-frame adjacent to said channel, provided with means for engagement with the engaging means on said film, to cause a feed movement thereof in a given direction, means for giving a reciprocating movement to said slide-frame, and an endless loop of picture film supported in said channel.

7. In a display machine for picture films containing series of pictures arranged to be displayed in pairs, a frame, a stereoscopic apparatus supported therein, provided with a viewing space, having a cross-channel at its outer end, and transparencies in rear of said cross-channel, a slide-frame in said channel, provided with operating arms, a rotor provided with means for engagement with said arms, to give a reciprocating movement to said frame, means on said slide-frame for engagement with said picture films, to cause a feed movement thereof in said channel, and means for operating said rotor.

GIFFORD M. MAST.